United States Patent Office 2,729,557
Patented Jan. 3, 1956

2,729,557

METHOD OF PREVENTING DEPOSITION OF ALKALINE EARTH METAL SALTS IN CYANIDATION OF PRECIOUS METAL ORES

Robert B. Booth and Norman Hedley, Stamford, Conn., assignors to American Cyanamid Company, New York, N. Y., a corporation of Maine No Drawing. Application February 2, 1955,
Serial No. 485,822

13 Claims. (Cl. 75—105)

This invention relates to an improved method of cyanidation.

The cyanidation of precious metal ores is a widely practiced method of recovering the metal values from such ores. In general, cyanidation has to be carried out under alkaline conditions, it being common practice to add lime or other alkaline compounds to the cyanidation mixture in order to improve results. Under the alkaline conditions in which cyanidation is effected, there is a considerable tendency to deposit salts on the surfaces of equipment such as pipe lines, launders, filers, valves, clarifiers, precipitators, presses, zinc boxes and the like. The nature of the deposition will vary with the mineral constituents of the ore pulp, the more common salts being calcium carbonate, magnesium hydroxide, calcium sulfate, calcium aluminate, and calcium silicate.

The reason for the rate of deposition of these salts is not completely known, but may well be due in many cases to a reaction between the carbon dioxide in the air and calcium hydroxide, for example, in cyanide solutions so as to precipitate calcium carbonate. In other cases, it may be due to the reaction between a soluble and slightly soluble constituent in the ore treated, such as magnesium sulfate, magnesium carbonate or similar minerals with the alkaline earth metal salts in the solution. In other cases, it may be due to a saturated condition of the solutions with respect to the salts deposited. This latter condition frequently results when a roasted product containing calcium sulfate is subjected to cyanidation.

The use in the cyanidation circuit of make-up water from different sources may also be a factor in some cases where the water contains dissolved carbon dioxide, bicarbonates, carbonates or sulfates. When this water comes in contact with a cyanide solution, as, for example, when used as make-up water, as a spray on filters, to wash down launders, etc., reaction with the calcium hydroxide in the cyanide solution takes place to precipitate calcium carbonate.

The deposition of these alkaline earth metal salts and other fine material on filters and clarifiers blinds and clogs filtration media and is particularly troublesome as it necessitates frequent stoppages of equipment to free the filters. In addition to the inactivation of equipment and the labor entailed, acid treatment is frequently required. This shortens the life of filter cloth very materially. This problem is aggravated by the presence of mineral slimes which, when associated with the above-described alkaline earth salt precipitates, form hard deposits which are difficult to remove.

The present invention is based upon the discovery that the deposition of alkaline earth metal salts from cyanide solutions may be very greatly reduced by the addition to the cyanidation circuit of a small amount of a synthetic polymeric water-soluble polyelectrolyte having an average molecular weight of at least 10,000, and having a structure derived by the substantially linear polymerization of at least one monoolefinic compound through the aliphatic unsaturated group. The water-soluble polymers may be used alone or particularly effective results are obtained when they are used in combination with polyphosphates as more particularly hereinafter described.

Particularly suitable polyelectrolytic polymers for use in the present invention are the polymers of acrylic or methacrylic acid derivatives, for example acrylic acid, the alkali metal and ammonium salts of acrylic acid, methacrylic acid, the alkali metal and ammonium salts of methacrylic acid, acrylamide, methacrylamide, the N-alkyl substituted amides, the N-aminoalkylamides, and the corresponding N-alkylaminoalkyl substituted amides, the aminoalkyl acrylates, the aminoalkyl methacrylamides and the N-alkyl substituted amino-alkyl esters of either acrylic or methacrylic acids. These polymeric compositions may be homopolymers or they may be copolymers with other copolymerizing monomers such as ethylene, propylene, isobutylene, styrene, α-methylstyrene, vinyl acetate, vinyl formate, alkyl ethers, acrylonitrile, methacrylonitrile, vinyl chloride, vinylidene chloride, the alkyl acrylates, the alkyl methacrylates, the alkyl maleates, and the alkyl fumarates, and other olefinic monomers copolymerizable therewith. The copolymers of this type, having at least 50 mole per cent of the acrylic or methacrylic acid derivatives, are preferred, and especially when the comonomer is hydrophobic or has no ionizable groups. Polymers of this type may be prepared directly by the polymerization of suitable monomers, or by the after chemical reaction of other polymers, for example by the hydrolysis of acrylonitrile or methacrylitrile polymers.

In connection with the various types of polyelectrolytic polymers suitable for the practice of this invention, the hydrophilic polymer may be prepared directly by the polymerization or copolymerization of one or more of the various available organic monomers with aliphatic unsaturation, if the said compounds contain a hydrophilic group, for example carboxyl groups. Generally, more types of polyelectrolytic polymers can be prepared by subsequent reactions of polymers and copolymers. For example, polymers containing nitrile groups may be hydrolyzed to form water-soluble amide and carboxy containing polymers or hydrogenated to form amine containing polymers. Similarly copolymers of maleic anhydride and vinyl acetate may be hydrolyzed to form polymers containing hydrophilic lactone rings. Other hydrophilic polymers may be prepared by the hydrolysis of copolymers of vinyl acetate wherein the acetyl groups are removed leaving hydroxy groups which promote the solubilization effect of polyelectrolytic groups present. By other reactions non-hydrophilic polymers may be converted into lactam or amide containing polymers which are more hydrophilic. Polyvinyl alcohol, not in itself a polyelectrolyte, may be converted into polyelectrolytes by esterification with dibasic acids, one of said carboxylic acid groups reacting with the alcohol radical and the other providing the hydrophilic characteristics by a carboxy group on the side chain. Still other types of polymers may be prepared by reacting halogen containing polymers, for example the polymers or copolymers of vinyl chloroacetate or vinyl chloroethyl ether, with amines to form amine salt radicals and quaternary ammonium radicals whereby hydrophilic characteristics are introduced into what otherwise would be an insoluble polymer. Other soluble polymers may be prepared by the ammonolysis of ketone containing polymers, for example polyvinyl methyl ketone. Similarly active halogen atoms may be reacted with bisulfite to substitute sulfonic acid group for the reactive halogens.

Thus, the various polyelectrolytes of the types described above are ethylenic polymers having numerous side chains distributed along a substantially linear continuous carbon atom molecule. The side chains may be hydrocarbon groups, carboxylic acid groups or derivatives thereof, sulfonic acid groups, or derivatives thereof, phosphoric acid or derivatives thereof, heterocyclic nitrogen groups, amino-alkyl groups, alkoxy radicals and other organic groups, the number of which groups and the relative proportions of hydrophilic and hydrophobic groups being such as to provide a water-soluble polymeric compound having a substantially large number of ionizable radicals. The length of the said continuous carbon chain must be such as to provide compounds having a weight average molecular weight of at least 10,000.

Among the various polymers as described above and water-soluble salts thereof useful in the practice of the present invention, there may be mentioned hydrolyzed polyacrylonitrile and polyacrylamide, sulfonated polystyrene, acrylamide-acrylic acid copolymers, polyacrylic acid, ½ calcium salt of hydrolyzed 1:1 copolymer of vinyl acetate-maleic anhydride, hydrolyzed styrenemaleic anhydride copolymer, ammonium polyacrylate, sodium polyacrylate, ammonium polymethacrylate, sodium polymethacrylate, diethanolammonium polyacrylate, guanidinium polyacrylate, dimethylaminoethyl polymethacrylate, acrylamide-acrylonitrile copolymer, methacrylic acid-dimethylaminoethyl methacrylate copolymer, sodium polyacrylate-vinyl alcohol copolymer, hydrolyzed methacrylic acid-acrylonitrile copolymer, vinyl acetate-maleic anhydride copolymer, vinyl formate-maleic anhydride copolymer, vinyl methyl ether-maleic anhydride copolymer, isobutylene-maleic anhydride copolymer, styrene-maleic anhydride copolymer, ethyl acrylate-maleic anhydride copolymer, vinyl chloride-maleic anhydride copolymer, hydrolyzed acrylonitrilevinyl acetate copolymer, hydrolyzed acrylonitrile-methacrylonitrile copolymer, hydrolyzed acrylonitrile-methacrylonitrile-vinyl acetate terpolymer, hydrolyzed acrylonitrile-methacrylic acid copolymer, vinyl pyridine-acrylonitrile copolymer, etc. Polymers containing cation-active groups are also useful. Suitable compounds are, for example, ethyl acrylate and acrylamidopropylbenzyldimethylammonium chloride, copolymers of methylolacrylamide and acrylamidopropylbenzyldimethylammonium chloride, copolymers of butadiene and 2-vinyl pyridine, and certain quaternary compounds such as polydimethylaminostyrene quaternized with benzyl chloride, allyl chloride, etc., and quaternized copolymers of vinyl alcohol and morpholinylethylvinylether and the like.

Among the especially preferred polymeric compounds are the sodium salts of hydrolyzed polyacrylonitrile and hydrolyzed, preferably alkali hydrolyzed, polyacrylamides. Copolymers of acrylamide and acrylic acid are also highly effective. The sodium salts of hydrolyzed polyacrylonitriles may be prepared in the conventional manner, i. e., by subjecting a polyacrylonitrile to hydrolysis with sodium hydroxide, for example. The hydrolysis usually goes to about 75% completion, or in other words, about three out of every four nitrile groups are hydrolyzed to carboxylic acid groups. The hydrolyzed polyacrylamides may be prepared by subjecting a polyacrylamide to hydrolysis either under alkali or acid conditions. That is to say, sodium hydroxide, for example, may be used, or a strong acid may be used. In either event, the hydrolysis is about 50-60% effective so that the final products consist of a hydrolyzed polymer having varying ratios of amide and carboxylic acid groups. Copolymers of acrylamide and acrylic acid are prepared by copolymerizing these two materials.

When these especially preferred polymers are to be used in the practice of the present invention, it has been found that the polymers should contain at least about 10% carboxy groups.

The polymers obtained by hydrolyzing polymeric material containing polyacrylonitrile are cheap and give excellent results. Here again, the polymer may be a homopolymer or the acrylonitrile may be copolymerized with small amounts of other materials, such as vinyl pyridine, vinyl acetate, styrene, vinyl ethers, vinyl halides, acrylic esters and the like.

It is an advantage of the present invention that the hydrolyzed polyacrylonitriles may be of very low grade. It is thus possible to use polyacrylonitriles which have insufficient purity for other uses, such as fibers. The possibility of using these normally discarded, off-grade products makes a source of very cheap material available for use in the present invention. Where the amount of by-product, off-grade material is not sufficient to supply the demand and the polymers must be made directly, it is usually found that the homopolymer of acrylonitrile is somewhat cheaper to make than the copolymers.

For optimum beneficial effect, the molecular weight of the polymers is of some importance in preventing the deposition of the alkaline earth metal salts from the cyanide solutions. It appears that the molecular weight should be at least about 10,000 in order to secure the desired results. The upper molecular weight limit does not appear to be at all critical and is set only by the practical difficulty of making extremely highly polymerized polymers. Polymers having molecular weights ranging upwards to about 975,000 have been satisfactorily used in the practice of the present invention. Those polymers having molecular weights much in excess of this value are difficult to get into solution or to form dispersions thereof in water. Thus, the insoluble or nondispersible polymers are not included herein. However, so long as the polymer is water-soluble or water-dispersible it is operable in carrying out the present invention.

It is an additional advantage of the present invention that the reagents mentioned have a pronounced flocculating effect on mineral and other slimes carried in suspension by the cyanidation solutions thereby improving filtration and the ease of cleaning the filters. Thus, the aforementioned reagents perform the dual function of sequestering alkaline earth metal salts and flocculating mineral and other slimes.

It is a further advantage of the present invention that the described polymers may be used effectively along with polyphosphates in sequestering or otherwise preventing the precipitation of alkaline earth metal salts from cyanide solutions. Although the polyphosphates have been used for this purpose in the past, we have found unexpectedly that the conjoint use of the described polymers and certain polyphosphates results in even more effective sequestration of the alkaline earth metal salts from cyanide solutions. This effect in many cases appears to be synergistic and in all cases makes it possible to reduce somewhat the quantity of the more expensive polymer that is to be used.

Useful polyphosphates in this aspect of this invention are the polyphosphoric acids and their alkali metal salts such as sodium tripolyphosphate, sodium tetraphosphate, sodium hexametaphosphate, sodium acid pyrophosphate, tetrasodium pyrophosphate and the like and analogous and related potassium and ammonium derivatives.

The invention will be described in greater detail in conjunction with the following specific examples in which the parts are by weight unless otherwise specified.

*Example 1*

The effects of the sodium salt of hydrolyzed polyacrylonitriles on the precipitation of calcium carbonate from cyanide solutions were determined by the following procedure:

A solution containing 0.05 per cent sodium bicarbonate was prepared by dissolving the requisite amount of solid sodium bicarbonate in water. As regards bicarbonate ion content, this solution represented a hard water, i. e., equivalent to 312 p. p. m. $CaCO_3$.

A second solution was prepared containing 0.019 per cent NaCN, 0.041 per cent CaO, 0.042 per cent $CaSO_4$. This solution represented a mill cyanide solution.

Several 250 cc. portions of the bicarbonate solution were transferred to 600 cc. beakers. Measured amounts of the reagent were added. Then a 250 cc. portion of the cyanide solution was added to each beaker. The solutions were allowed to stand for 2 hours during which time they were stirred vigorously every half hour. A control test was also run in which the same procedure with the same solutions was used, but no reagent was added.

The precipitated calcium carbonate was determined quantitatively for each test. The results are shown in Table I.

TABLE I

| Reagent Added | Amount, p. p. m. | $CaCO_3$ ppted., p. p. m. | $CaCO_3$ sequestered, p. p. m. | p. p. m. $CaCO_3$ sequestered per 1 p. p. m. reagent |
|---|---|---|---|---|
| Control | None | 312 | | |
| The sodium salt of hydrolyzed polyacrylonitrile | 0.5 | 302 | 10 | 20 |
| Do | 5 | 242 | 70 | 14 |
| Do | 5 | 237 | 75 | 15 |

*Example 2*

Two solutions were prepared as in Example 1. A series of tests was run following the same procedure using various amounts of reagents. A control test was also carried out. The results are shown in Table II.

TABLE II

| Reagent Added | Amount, p. p. m. | $CaCO_3$ ppted., p. p. m. | $CaCO_3$ sequestered, p. p. m. | p. p. m. $CaCO_3$ sequestered per 1 p. p. m. reagent |
|---|---|---|---|---|
| Control | None | 309 | | |
| The sodium salt of hydrolyzed polyacrylonitrile | 2 | 269 | 40 | 20 |
| Do | 5 | 250 | 59 | 11.8 |
| Do | 10 | 225 | 84 | 8.4 |
| Do | 25 | 201 | 108 | 4.3 |
| Do | 50 | 199 | 110 | 2.2 |
| Do | 100 | 134 | 175 | 1.8 |

*Example 3*

The following experiments demonstrate the effectiveness of the sodium salt of hydrolyzed polyacrylonitrile in preventing the deposition (i. e. sequestering) of calcium sulfate.

A saturated solution of calcium sulfate analyzing 0.209 per cent $CaSO_4$ was prepared. 500 cc. portions of this solution were transferred to 600 cc. beakers. Measured amounts of the sodium salt of hydrolyzed polyacrylonitrile were added to two of the portions. No reagent was added to the third portion which was used as the control. The solutions were allowed to evaporate at room temperature until the volume was 250 cc., i. e., one-half of the original volume. The precipitated salts were then filtered off, the filtrate assayed for $CaSO_4$ content, and the amount of $CaSO_4$ deposited then determined. The results are shown in Table III.

TABLE III

| Reagent Added | Amount, p. p. m. | $CaSO_4$ ppted., p. p. m. | $CaSO_4$ sequestered, p. p. m. | p. p. m. $CaSO_4$ sequestered per 1 p. p. m. reagent |
|---|---|---|---|---|
| Control | None | 634 | | |
| The sodium salt of hydrolyzed polyacrylonitrile | 5 | 84 | 550 | 110 |
| Do | 50 | 30 | 604 | 12.1 |

*Example 4*

A sodium bicarbonate solution was prepared as in Example 1 in which the bicarbonate ion content was equivalent to 300 p. p. m. $CaCO_3$.

A cyanide solution was also prepared containing 0.010 per cent NaCN, 0.021 per cent CaO, and 0.020 per cent $CaSO_4$. The identical procedure of Example 1 was then followed using the amounts of the polymers as indicated below. The results obtained are shown in Table IV.

TABLE IV

| Reagent Added | M. W. | Percent Amide | Percent Acid | Amount, p. p. m. | p. p. m. $CaCO_3$ Sequestered |
|---|---|---|---|---|---|
| Hydrolyzed polyacrylamide | 975,000 | 78 | 23 | 5 | 6 |
| Do | 975,000 | 78 | 23 | 50 | 45 |
| Do | 975,000 | 56 | 44 | 5 | 46 |
| Do | 975,000 | 56 | 44 | 50 | 118 |
| Do | 975,000 | 42 | 58 | 5 | 46 |
| Do | 975,000 | 42 | 58 | 50 | 177 |
| Do | 360,000 | 88 | 12 | 5 | 12 |
| Do | 360,000 | 88 | 12 | 50 | 28 |
| Do | 360,000 | 77 | 23 | 5 | 25 |
| Do | 360,000 | 77 | 23 | 50 | 59 |
| Do | 360,000 | 69 | 31 | 5 | 46 |
| Do | 360,000 | 69 | 31 | 50 | 144 |
| Do | 360,000 | 60 | 40 | 5 | 60 |
| Do | 360,000 | 60 | 40 | 50 | 203 |
| Do | 360,000 | 52 | 48 | 5 | 62 |
| Do | 360,000 | 52 | 48 | 50 | 252 |
| Do | 360,000 | 45 | 55 | 5 | 86 |
| Do | 360,000 | 45 | 55 | 50 | 248 |
| Do | 360,000 | 36 | 64 | 5 | 65 |
| Do | 360,000 | 36 | 64 | 50 | 246 |
| Do | 200,000 | 72 | 28 | 5 | 36 |
| Do | 200,000 | 72 | 28 | 50 | 62 |
| Do | 200,000 | 55 | 45 | 5 | 72 |
| Do | 200,000 | 55 | 45 | 50 | 235 |
| Do | 200,000 | 42 | 58 | 5 | 67 |
| Do | 200,000 | 42 | 58 | 50 | 260 |

*Example 5*

A mixture was prepared containing one part of sodium tripolyphosphate and two parts of a hydrolyzed polyacrylamide having a molecular weight of 200,000 and containing 42% amide and 58% carboxyl groups. The mixture was tested for sequestration as described in Example 1. The results are compared below against the use of sodium tripolyphosphate alone and the same polymer alone.

| Mixture | | Polymer Alone | | Sodium Tripolyphosphate Alone | |
|---|---|---|---|---|---|
| Amount p.p.m. Used | p.p.m. $CaCO_3$ Sequestered | Amount p.p.m. Used | p.p.m. $CaCO_3$ Sequestered | Amount p.p.m. Used | p.p.m. $CaCO_3$ Sequestered |
| 25 | 153 | 25 | 131 | 25 | 134 |
| 50 | 287 | 50 | 260 | 50 | 120 |
| 100 | 301 | | | 100 | 72 |

*Example 6*

The following series of mixtures of one part polyphosphate and two parts of polymer were tested for sequestration in the manner described in Example 1. The results are compared below with polyphosphate alone and with polymer alone.

A mixture of a hydrolyzed polyacrylamide having a molecular weight of 975,000 and containing 42% amide and 58% carboxyl groups and sodium tetraphosphate.

| Amount Used | p.p.m. $CaCO_3$ Sequestered | | |
|---|---|---|---|
| | $Na_6P_4O_{13}$ | Polymer | Mixture |
| 5 p.p.m. | 98 | 46 | 110 |
| 50 p.p.m. | 37 | 177 | 194 |

A mixture of a hydrolyzed polyacrylamide having a molecular weight of 975,000 and containing 56% amide and 44% carboxyl groups and sodium hexametaphosphate.

| Amount Used | p.p.m. CaCO3 Sequestered | | |
|---|---|---|---|
| | (NaPO3)6 | Polymer | Mixture |
| 5 p.p.m. | 106 | 46 | 112 |
| 50 p.p.m. | 98 | 118 | 211 |

A mixture of a hydrolyzed polyacrylamide having a molecular weight of 365,000 and containing 36% amide and 64% carboxyl groups and sodium acid pyrophosphate.

| Amount Used | p.p.m. CaCO3 Sequestered | | |
|---|---|---|---|
| | Na2H2P2O7 | Polymer | Mixture |
| 5 p.p.m. | 115 | 65 | 123 |

A mixture of a hydrolyzed polyacrylamide having a molecular weight of 360,000 and containing 45% amide and 55% carboxyl groups nad tetrasodium pyrophosphate.

| Amount Used | p.p.m. CaCO3 Sequestered | | |
|---|---|---|---|
| | Na4P2O7 | Polymer | Mixture |
| 5 p.p.m. | 103 | 86 | 130 |
| 50 p.p.m. | 42 | 248 | 255 |

A mixture of a hydrolyzed polyacrylamide having a molecular weight of 200,000 and containing 55% amide and 45% carboxyl groups and sodium tetraphosphate.

| Amount Used | p.p.m. CaCO3 Sequestered | | |
|---|---|---|---|
| | Na6P4O13 | Polymer | Mixture |
| 5 p.p.m. | 98 | 72 | 120 |

A mixture of a hydrolyzed polyacrylamide having a molecular weight of 200,000 and containing 55% amide and 45% carboxyl groups and sodium hexametaphosphate.

| Amount Used | p.p.m. CaCO3 Sequestered | | |
|---|---|---|---|
| | (NaPO3)6 | Polymer | Mixture |
| 5 p.p.m. | 106 | 72 | 116 |
| 50 p.p.m. | 98 | 235 | 271 |

*Example 7*

The procedure of Example 1 was followed using the polymers listed below. The data obtained are shown in Table V.

TABLE V

| Reagent Added | Amount, p.p.m. | p.p.m. CaCO3 Sequestered |
|---|---|---|
| Acrylamide-acrylic acid copolymer (85-15) | 5 | 25 |
| Hydrolyzed polymethylolacrylamide | 5 | 42 |
| Acrylamide-diallyldimethyl-ammoniumchloride Copolymer | 5 | 33 |
| Acrylamide-N-β-hydroxyethyl-2-methyl-5-vinyl-pyridiniumchloride | 50 | 24 |
| Sulfonated Polystyrene | 5 | 36 |
| Copolymer of vinyl methyl ether and maleic anhydride | 50 | 56 |
| Copolymer of maleic anhydride and vinyl acetate (½ calcium salt) | 5 | 20 |

We claim:
1. The method of preventing the deposition of alkaline earth metal salts from cyanide solutions which comprises incorporating in the solution a small amount of a synthetic polymeric water-soluble polyelectrolyte having an average molecular weight of at least 10,000, and having a structure derived by the substantially linear polymerization of at least one monoolefinic compound through the aliphatic unsaturated group.
2. The method according to claim 1 in which the polymer is a sodium salt of a hydrolyzed polymer of acrylonitrile.
3. The method according to claim 1 in which the polymer is a hydrolyzed polyacrylamide.
4. The method according to claim 1 in which the polymer is a copolymer of acrylamide-acrylic acid.
5. The method according to claim 1 in which a water-soluble polyphosphate is also added to the cyanide solution.
6. The method according to claim 2 in which a water-soluble polyphosphate is also added to the cyanide solution.
7. The method according to claim 3 in which a water-soluble polyphosphate is also added to the cyanide solution.
8. The method according to claim 4 in which a water-soluble polyphosphate is also added to the cyanide solution.
9. The method according to claim 5 in which the polyphosphate is an alkali metal salt of a tripolyphosphate.
10. The method according to claim 5 in which the polyphosphate is an alkali metal salt of a tetraphosphate.
11. The method according to claim 5 in which the polyphosphate is an alkali metal salt of a hexametaphosphate.
12. The method according to claim 5 in which the polyphosphate is an alkali metal salt of an acid pyrophosphate.
13. The method according to claim 5 in which the polyphosphate is an alkali metal salt of a pyrophosphate.

References Cited in the file of this patent

UNITED STATES PATENTS

| 244,080 | Sanders | July 12, 1881 |
| 1,136,872 | Hamilton | Apr. 20, 1915 |
| 2,131,535 | Hedley | Sept. 27, 1938 |
| 2,171,842 | Barrett et al. | Sept. 5, 1939 |
| 2,685,565 | Jones et al. | Aug. 3, 1954 |

OTHER REFERENCES

"Versene," published by Bersworth Chemical Co., Framingham, Mass. 1949. 26 pages.

Ruehrwein et al.: "Mechanism of Clay Aggregation by Polyelectrolytes," Soil Science, vol. 73, No. 6, pages 419 and 485–492.